United States Patent

Nelson et al.

[11] Patent Number: 5,610,501
[45] Date of Patent: Mar. 11, 1997

[54] DYNAMIC POWER AND VOLTAGE REGULATOR FOR AN AC TRANSMISSION LINE

[75] Inventors: Robert J. Nelson, Orlando; Donald G. Ramey, Maitland, both of Fla.

[73] Assignee: Westinghouse Electric Corporation, Pittsburgh, Pa.

[21] Appl. No.: 380,991

[22] Filed: Feb. 1, 1995

[51] Int. Cl.⁶ .................................................. G05F 1/70
[52] U.S. Cl. .................................................. 323/207
[58] Field of Search .................................... 323/205, 207, 323/208, 212; 307/102, 105; 363/34, 35, 37, 39, 40, 51, 95

[56] References Cited

U.S. PATENT DOCUMENTS

| | | | |
|---|---|---|---|
| 4,348,630 | 9/1982 | Boenig et al. | 323/207 |
| 5,166,597 | 11/1992 | Larsen et al. | 323/215 |
| 5,198,746 | 3/1993 | Gyugyi et al. | 323/207 |
| 5,287,288 | 2/1994 | Brennen et al. | 364/483 |
| 5,329,222 | 7/1994 | Gyugyi et al. | 323/207 |
| 5,343,139 | 9/1994 | Gyugyi et al. | 323/207 |
| 5,349,283 | 9/1994 | Jee | 323/207 |
| 5,469,044 | 11/1995 | Gyugyi et al. | 323/207 |

FOREIGN PATENT DOCUMENTS

| | | | |
|---|---|---|---|
| 0033842 | 8/1981 | European Pat. Off. | |
| 300445 | 7/1974 | Germany | 323/207 |
| 4323290 | 1/1995 | Germany. | |
| 9420892 | 9/1994 | WIPO. | |

*Primary Examiner*—Peter S. Wong
*Assistant Examiner*—Adolf Berhane

[57] ABSTRACT

Apparatus for providing reactive compensation and positive real power compensation in an ac electric power transmission system, utilizes a solid state inverter to inject a series compensation voltage into the transmission line at a controllable magnitude and a controllable phase angle between + or −90 electrical degrees relative to transmission line current. The positive real power needed by the inverter is drawn from the transmission line by a rectifier shunt connected to the line.

8 Claims, 1 Drawing Sheet

DYNAMIC POWER AND VOLTAGE REGULATOR FOR AN AC TRANSMISSION LINE

BACKGROUND OF THE INVENTION

1. Field of the Invention

This invention relates to apparatus for controlling the flow of power and dynamic voltage regulation on ac transmission lines, and more particularly, to economical apparatus for providing reactive and positive real power compensation in such ac transmission lines.

2. Background of Information

Traditionally, the only device available to power system engineers for controlling the direction and magnitude of power flow in a transmission line was the Phase-Angle Regulator (PAR). PARs typically consist of inter-connected transformers, one of which is essentially a large load tap changer.

Despite the flexibility that PARs introduce to the system operator, they never acquired widespread usage because they are slow and they have a relatively poor reputation for reliability. Also, they introduce a high series impedance in the line. The slow speed and poor reputation for reliability are mainly attributable to the use of mechanical load tap changers. Recent improvements in load tap changers seem to have improved reliability perceptions, but the slow speed (several seconds per tap change and a minute or more for major angle changes) renders these devices unusable for all but steady-state concerns. The high series impedance results from the connection of the two transformers. The leakage reactance of the series winding always appears in series with the supply transmission line whenever the PAR is in service. The leakage reactance of the excitation winding also appears in series with the supply transmission line, but varies with the angle shift.

The reactance inserted in a line by a phase shifter can be quite significant. Indeed, it is not uncommon, particularly on cable circuits, for the reactance of the PAR to exceed the reactance of the line with which it is placed in series. An additional consequence of the relatively high impedance of PARs is that they can consume significant amounts of reactive power at high power transfer levels; normally, a large reactive power source must be located close to a PAR to ensure adequate voltage regulation during contingencies.

Because of its slow control and relatively high impedance, the existence of a PAR on the system is normally considered detrimental during incidents where transient or dynamic stability may be a concern. Even though there has been some consideration recently to increasing the switching speed (by using thyristor switching) for transient and dynamic stability situations, the inherent high reactance of PARs can be a significant problem. Considering these problems, it is no surprise that Phase-Angle Regulators have been infrequently used on transmission systems, even though they provide the system operator with a degree of control of transmission line flows that could not be matched by any other existing device.

Recently, the concept of using a three-phase inverter to insert a voltage into a transmission line via a series transformer to facilitate transmission of power has been proposed. In essence, the exciting transformer is replaced by a three-phase inverter. The inverter, employing Gate Turn-Off (GTO) thyristors, is capable of either supplying vars to the transmission line or absorbing vars from the transmission line as a free-standing device. When the inverter is used in this fashion, the device is called a Series Power-Flow Controller (SPFC). Such a controller is disclosed in U.S. Pat. No. No. 5,198,746.

The SPFC injects a voltage in quadrature with the line current. Thus, the SPFC can only provide reactive power compensation. It has no capability to absorb or generate real power. Although it is convenient to think of the SPFC as analogous to a variable series capacitor or reactor, it is considerably more powerful than this. However, a short coming that the SPFC shares with variable series capacitors is that it has little capability to transfer real power at very low system angles because of its limited capability to introduce a phase shift at low system angles.

To introduce a phase shift, an additional dimension is required. Specifically, real power must be injected by the series inverter. To the extent that the real and reactive power insertions differ from real and reactive power consumption of the line, the difference shows up as an injected phase angle. If the real power interchange can be effected in both directions (i.e., from the device to the system and vice-versa), the resulting device is called a Unified Power Flow Controller (UPFC). Such a device is described in U.S. Pat. No. 5,343,139. This device has the capability of controlling reactive power flow, transmission line impedance, transmission line voltage magnitude, and transmission line voltage phase angle. The real power is drawn from the transmission line by an ac to dc converter and supplied to the series inverter through a dc link. The UPFC provides a great deal of flexibility in power flow control; however, the shunt ac to dc converter adds significantly to the cost and complexity of the apparatus.

Commonly owned U.S. patent application Ser. No. 08/368,947 filed on Jan. 5, 1995 (now U.S. Pat. No. 5,469,044), suggests that for applications in which the control requirements are asymmetrical, the MVA ratings of the series inverter and shunt converter can be reduced by vectorially adding a bias voltage to the voltage generated by the series inverter. However, this arrangement still requires the series inverter and a shunt connected AC to DC converter. Commonly owned U.S. patent application Ser. No.08/366,646 filed on Dec. 30, 1994 discloses a series-connected inverter which can supply both positive and negative real power in addition to reactive power compensation to control oscillations on a transmission line. The real power requirements are provided by devices which are independent of the transmission line. Both positive and negative real power can be provided by an energy storage device such as a battery or a super-conducting magnet. Where less dynamic compensation is required to control oscillations, only positive real impedance in the form of a resistive impedance can be used to absorb real power from the transmission line during positive real power surges. These devices require switching control to regulate the flow of real power.

U.S. Pat. No. 5,329,222 discloses a dynamic voltage restorer in which a series inverter injects a voltage into the transmission line to compensate for voltage sags. The real power needed to generate this injected voltage is provided by an energy storage device such as a capacitor, and preferably a converter such as a chopper is utilized between the capacitor and the converter to provide a constant dc input to the series inverter.

There are applications where only positive real power needs to be injected for controlling power flow or for dynamic voltage regulation.

There is a need, therefore, for apparatus for controlling power flow on an alternating current transmission system which does not require a shunt converter or energy storage devices with the accompanying switching apparatus in order to provide real power compensation.

There is a related need for an improved apparatus of this type which is economical.

SUMMARY OF THE INVENTION

These needs and others are satisfied by the invention which is directed to a dynamic power and voltage regulator (DP/VR) for a transmission line which is capable of economically providing the injection of real power compensation in addition to reactive power compensation into a transmission line. In its preferred implementation, the invention consists of an inverter supplied with a source of real power connected in series with an alternating current power line. The real power supplied to the inverter is taken from the transmission system via the operation of a shunt-connected rectifier. The series inverter by its self has the capability to provide variable reactive series compensation to the line. When supplied with a source of real power, as in this invention, the inverter has a supplemental ability to provide real series compensation (i.e., compensation for the resistive voltage drop caused by current flow through the line's series resistance) to the line. Since the real power loss of a transmission line is always positive, the power supplied by the resistive compensator is also always positive and the apparatus of this invention appears to provide the line with a "negative resistance" characteristic in operation. Another application of the invention is to supply series voltage regulation during a system dynamic voltage variation (i.e., a system voltage sag). This is accomplished without the need for an energy storage device, as the real power is drawn from the line through the rectifier.

More particularly, the invention is directed to apparatus for controlling an alternating current transmission system including a transmission line carrying alternating current at a selected transmission line voltage, said apparatus comprising:

switching power converter means generating an alternating voltage at said fundamental frequency of said alternating current with controllable magnitude and phase angle relative to said alternating current;

means coupling said alternating voltage generated by said switching power converter means into said transmission line in series with said transmission line voltage;

control means controlling the controllable magnitude of the alternating voltage and controlling the controllable phase of the alternating voltage to any phase angle between −90 electrical degrees and +90 electrical degrees relative to said alternating current to inject adjustable reactive compensation and adjustable positive real power into said transmission line; and rectifier means connected in shunt to said transmission line and to said switching power converter to provide said positive real power to said switching power converter to provide said positive real power to said switching power converter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
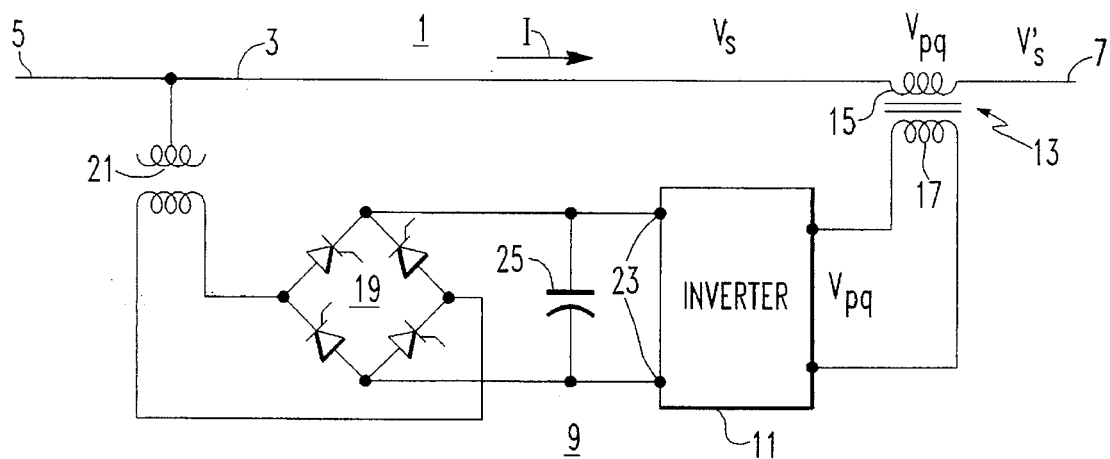
FIG. 1 is a schematic diagram of a dynamic power/voltage regulator in accordance with the invention.

FIG. 1 illustrates an alternating current transmission system 1 which includes the transmission line 3 which would typically be a three-phase line but is shown in single line for clarity of explanation. The transmission line carries a current I between two ends 5 and 7 of the transmission line 3 at a voltage $V_s$. Power flow control or dynamic voltage regulation on the transmission line 3 is provided by the dynamic power/voltage regulator (DP/VR) 9 of the invention. The DP/VR 9 includes a preferably voltage sourced solid-state inverter 11 such as that disclosed in U.S. Pat. No. 5,343,139 which is hereby incorporated by reference. The inverter 11 generates a voltage $V_{pq}$ having a controllable magnitude and a controllable phase angle relative to the current I on the transmission line 3. This compensation voltage $V_{pq}$ is injected in series with the transmission line voltage $V_s$ through a series transformer 13 having its primary winding 15 connected in series with the transmission line 3 and its secondary winding 17 connected to the output of the inverter 11. As mentioned, the inverter 11 series connected in the transmission line 35 by the series transformer 13 has the capability by itself to provide variable reactive series compensation to the line 3.

In order to also provide real series compensation, the inverter 11 must be supplied with real power. In accordance with the present invention, the real power is drawn from the transmission line 3 by shunt connected rectifier 19. The rectifier 19 is shunt connected with the transmission line by a shunt transformer 21. The rectifier 19 is connected to dc terminals 23 of the inverter 11 by a dc link comprising the capacitor 25. As power can only be drawn from the transmission line by the rectifier 19, the inverter 11 is only capable of supplying positive real power through the series transformer 13; it cannot absorb real power as the Unified Power Flow Controller (UPFC) of U.S. Pat. No. 5,343,139 can. However, the UPFC requires an ac to dc converter or other device for providing or absorbing real power in place of the rectifier 19. The rectifier 19, however, is considerably less costly than the ac to dc converter and other devices. The rectifier 19 is preferably a phase controlled rectifier as shown in FIG. 1, or it could be an uncontrolled rectifier with a chopper for controlling the voltage to the inverter.

Figure 2:
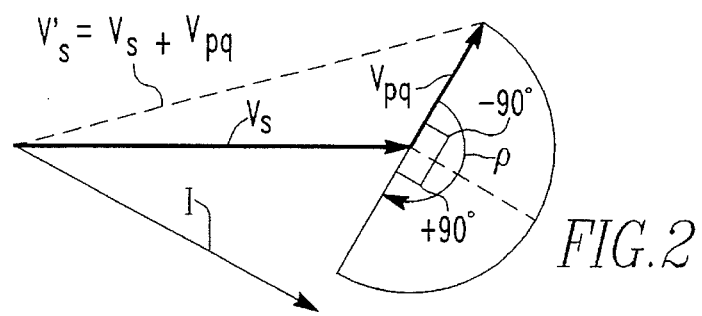
FIG. 2 is a phasor diagram illustrating the operation of the dynamic power/voltage regulator of FIG. 1.

FIG. 2 is a phasor diagram illustrating the operation of the DP/VR of FIG. 1. The inverter 11 by itself can generate the voltage $V_{pq}$ in quadrature with the current I. With the added capability of supplying positive real power to the transmission line, the inverter is able to generate the voltage $V_{pq}$ having a phase angle ρ of any value between −90 electrical degrees and +90 electrical degrees with respect to the current I. As the series transformer 13 injects the voltage $V_{pq}$ in series with the transmission line $V_s$, the resultant transmission line voltage $V'_s$ is the vectorial sum of $V_s$ and $V_{pq}$.

The solid-state series reactance compensator described in U.S. Pat. No. 5,198,746 is only capable of generating a voltage $V_{pq}$ in quadrature with the current I, while the UPFC of U.S. Pat. No. 5,343,139 is able to generate the voltage $V_{pq}$ at any angle, 0–360 electrical degrees with respect to the current I. Thus, it can be seen that the DP/VR of the invention is capable of performing the functions of the solid-state series reactance compensator of U.S. Pat. No. 5,198,746, and can also provide functions which are a subset of those provided by UPFC. It is reasonable, therefore for most situations, to describe the characteristics of the DP/VR as those of a solid-state series reactance compensator with a supplemental ability to provide resistive series compensation from its real power source. This resistive compensation capability becomes important on power lines with relatively low ratios of series reactance to series resistance, (e.g., those with X/R ratios $\leq 10$), where voltage is regulated by controlling the output of shunt reactive sources. This would typically be the case on a transmission, subtransmission, or distribution supply circuit. On a line with an X/R ratio of 5 supplying a unity power factor load, for example, the effect of the voltage drop due to resistance on the terminal voltage is four times that of the voltage drop due to reactance. In order to control voltage to values close to nominal (the nominal requirement in power systems), either large amounts of reactive power must be circulated through the line or real power compensation, such as that afforded by this invention, must be employed. The amount of real series compensation required can be small compared to the amount of shunt reactive power required to perform the voltage control function. For example, a short power line with a series reactance of (0.02+j.1) per unit supplying 1 per unit of real power can maintain unity terminal voltage within +/–0.5% by either using 0.02 pu of resistive compensation or 0.4 pu of terminal reactive compensation (0.25 pu capacitive at the load end +0.15 pu inductive at the source end). Clearly, a small amount of real power compensation can displace a large quantity of terminal reactive power for voltage control purposes.

Figure 3:
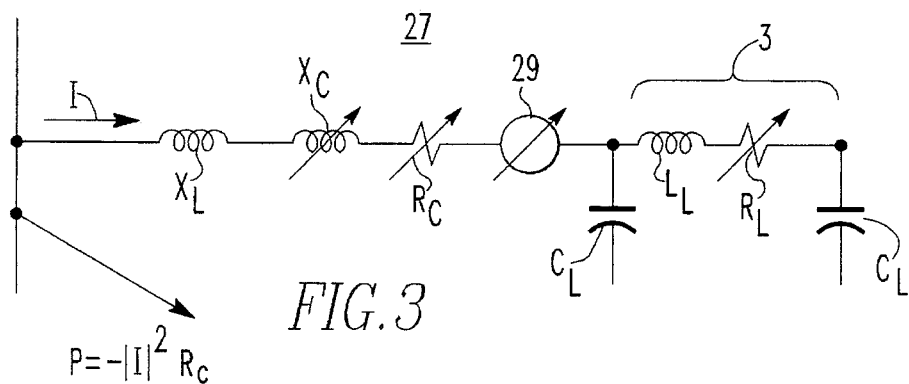
FIG. 3 illustrates an equivalent circuit for the dynamic power/voltage regulator of FIG. 1.

Although it is convenient to think of the DP/VR as a series compensator which has the capability to independently and simultaneously compensate power line series reactance and resistance, the DP/VR also has the capability to cause the transfer of real or reactive power through a line with no difference in terminal voltages, either in voltage magnitude or voltage phase angle. This is a characteristic which would not be available on a pure series impedance compensator. The voltage inserted by an impedance compensator would be proportional to the current flow through it; if there were no difference in terminal voltage, there would be no current flow, no inserted voltage and, hence, no real or reactive power flow. The DP/VR's inserted series voltage $V_{pq}$ is generated by the inverter 11, and so it does not depend on the current flow through it. Among commercial conventional power flow control devices, the only one which has an analogous capability is the phase angle regulator, which has the capability to transfer real power through a line with no terminal voltage difference. The name "dynamic power/ voltage regulator", then, describes a device which can simultaneously and independently provide power line series impedance compensation, real power flow control, and reactive power flow control, even with no terminal voltage difference across the line. An equivalent circuit model for the DP/VR being used for power flow control is shown in FIG. 3. The DP/VR equivalent circuit 27 includes the leakage reactance $X_L$ of the series transformer 13, series reactive compensation $X_C$, series resistive compensation $R_c$ and ideal phase regulator 29 connected in series with the line 3 represented by a series inductive impedance $L_L$ and resistance $R_L$, and line to ground capacitance $C_L$. The reactive and resistive compensation $X_c$ and $R_c$ is supplemented by the ideal phase angle regulator 29. In order to enforce the requirement that the real power into the DP/VR equals the real power out (neglecting losses), the real power compensation is reflected by a negative resistance (i.e., $R_c$ must be less than or equal to zero) and a shunt load of magnitude equal to the line's resistive compensation in watts. The ideal phase angle regulator 29 has a function only in the rare circumstance of a zero terminal voltage difference; otherwise it can be neglected.

Controls for the DP/VR 11 are essentially the same as those for the UPFC disclosed in U.S. Pat. No. 5,343,139 which can be referred to for the details, except that the DP/VR has no shunt voltage control capability, and the real power transfer from the shunt device 21 to the series device 13 in the DP/VR must always be greater than or equal to zero. The UPFC, in comparison, has both terminal voltage control and two-way transfer of power from the series device 13 to the shunt device 21. Again, the DP/VR's characteristics are a subset of the UPFC's. The DP/VR 9 retains all of the real power transfer capability of the UPFC, as well as the majority of the reactive power transfer capability. It does not have the UPFC's terminal voltage control capability, though. This voltage control capability may not be necessary in many cases, or it could be supplied more economically by other means.

Figure 4:
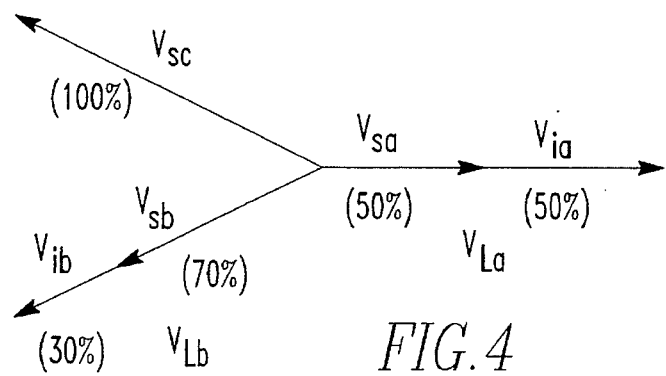
FIG. 4 is a phasor diagram illustrating the operation of the regulator of FIG. 1 for dynamic voltage regulation.

When used for series dynamic voltage regulation, the controls for the DP/VR are essentially those described for the dynamic voltage restorer (DVR) in U.S. Pat. No. 5,329, 222 which is hereby incorporated by reference, except that the energy storage device is replaced with the shunt connected rectifier 19. The function of the controls in this application is to insert a series voltage $V_{pq}$ during a dynamic incident so that acceptable levels of voltage magnitude are maintained at the load side of the DP/VR. The phasor diagram of FIG. 4 illustrates a representative voltage insertion during a voltage sag on phases A and B of a three-phase system. For the example depicted in FIG. 4, the system voltage is depressed to 50% of nominal on phase A ($V_{sa}$), 70% of nominal on phase B ($V_{sb}$), and remains at 100% of nominal on phase C. The DPR/VR's rectifier 19 draws power from the system 1 and inserts series voltage waveforms depicted as vectors $V_{ia}$ and $V_{ib}$, which are roughly in phase with the depressed corresponding system voltages, to maintain nominal load voltage until the voltage sag is relieved. The power drawn by the rectifier 19 is determined by the phase and magnitude of the inserted voltages and the current flow through the series insertion transformer 13.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for controlling an alternating current transmission system including a transmission line carrying alternating current at a selected transmission line voltage, and fundamental frequency said apparatus comprising:

switching power converter means generating an alternating voltage at said fundamental frequency of said alternating current with a controllable magnitude and a controllable phase angle between −90 electrical degrees and +90 electrical degrees relative to said alternating current to inject adjustable reactive compensation and adjustable positive real power;

means coupling said alternating voltage generated by said switching power converter means into said transmission line to inject said adjustable reactive compensation and adjustable positive real power into said transmission line; and in series with said transmission line voltage; and rectifier means connected in shunt to said transmission line and to said switching power converter means to provide said positive real power to said switching power converter means.

2. The apparatus of claim 1, wherein the rectifier means comprises a plurality of controlled rectifiers.

3. An apparatus for dynamically changing voltage in an ac transmission line or an ac distribution line carrying ac current at a fundamental frequency, said apparatus comprising:

switching power converter means generating an adjustable alternating voltage at said fundamental frequency of said ac current with a controllable magnitude;

means coupling said adjustable alternating voltage generated by said switching power converter means in series with said transmission line; and rectifier means connected in shunt to said transmission line and connected to said switching power converter means to provide positive real power to said switching power converter means.

4. The apparatus of claim 3, wherein said switching power converter means comprises a multiple phase inverter.

5. A method for controlling an alternating current transmission system including a transmission line carrying alternating current at a selected transmission line voltage, and fundamental frequency said apparatus comprising:

generating an alternating voltage at said fundamental frequency of said alternating current with a controllable magnitude and a controllable phase angle between −90 electrical degrees and +90 electrical degrees relative to said alternating current to inject adjustable reactive compensation and adjustable real power;

coupling said alternating voltage into said transmission line to inject said adjustable reactive compensation and adjustable positive real power into said transmission line, and in series with said transmission line voltage; and using a rectifier means connected in shunt to said transmission line to provide said positive real power for the step of generating an alternating voltage at said fundamental frequency of said alternating current with a controllable magnitude and a controllable phase angle.

6. The method of claim 5 wherein the controllable magnitude of the alternating voltage and the controllable phase angle of the alternating voltage to any phase angle between −90 electrical degrees and +90 electrical degrees relative to said alternating current effects independent regulation of transmission line series impedance and phase angle of said transmission line voltage.

7. The method of claim 5 wherein the controllable magnitude of the alternating voltage and the controllable phase angle of the alternating voltage to any phase angle between −90 electrical degrees and +90 electrical degrees relative to said alternating current effects dynamic regulation of said transmission line voltage in response to a dynamic variation in said transmission line voltage.

8. A method for dynamically changing voltage in an ac transmission line or an ac distribution line carrying ac current at a fundamental frequency, said apparatus comprising:

generating an adjustable alternating voltage at said fundamental frequency of said ac current with a controllable magnitude;

coupling said adjustable alternating voltage generated by said switching power converter means in series with said transmission line; and using a rectifier means connected in shunt to said transmission line and connected to said switching power converter means to provide positive real power to said switching power converter means.

* * * * *

Adverse Decision In Interference

Patent No. 5,610,501, Robert J. Nelson, Donald G. Ramey, DYNAMIC POWER AND VOLTAGE REGULATOR FOR AN AC TRANSMISSION LINE, Interference No. 104,216, final judgment adverse to the patentee rendered September 14, 2000, as to claims 1-8.

*(Official Gazette April 10, 2001)*